United States Patent
Tokutake

(10) Patent No.: US 9,519,423 B2
(45) Date of Patent: Dec. 13, 2016

(54) INFORMATION PROCESSING APPARATUS

(75) Inventor: Kenji Tokutake, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 218 days.

(21) Appl. No.: 13/403,575

(22) Filed: Feb. 23, 2012

(65) Prior Publication Data

US 2012/0268378 A1 Oct. 25, 2012

Related U.S. Application Data

(60) Provisional application No. 61/478,101, filed on Apr. 22, 2011.

(51) Int. Cl.
| | | |
|---|---|---|
| *G06F 3/041* | (2006.01) | |
| *G06F 3/045* | (2006.01) | |
| *G06F 3/0488* | (2013.01) | |
| *G06F 1/32* | (2006.01) | |
| *G06F 3/0486* | (2013.01) | |

(52) U.S. Cl.
CPC ......... *G06F 3/04883* (2013.01); *G06F 1/3206* (2013.01); *G06F 1/3262* (2013.01); *G06F 3/0416* (2013.01); *G06F 3/0486* (2013.01); *G06F 3/04886* (2013.01)

(58) Field of Classification Search
CPC ......... G06F 3/016; G06F 3/041; G06F 3/0488
See application file for complete search history.

(56) References Cited

U.S. PATENT DOCUMENTS

| | | | |
|---|---|---|---|
| 2007/0042823 A1* | 2/2007 | Shim | 463/9 |
| 2008/0082934 A1* | 4/2008 | Kocienda et al. | 715/773 |
| 2008/0305836 A1* | 12/2008 | Kim et al. | 455/564 |
| 2008/0309631 A1 | 12/2008 | Westerman et al. | |
| 2009/0309851 A1* | 12/2009 | Bernstein | 345/174 |
| 2011/0050618 A1* | 3/2011 | Murphy et al. | 345/174 |
| 2011/0148671 A1* | 6/2011 | Wong et al. | 341/27 |
| 2011/0248948 A1* | 10/2011 | Griffin et al. | 345/174 |
| 2012/0050333 A1 | 3/2012 | Bernstein | |

FOREIGN PATENT DOCUMENTS

| | | |
|---|---|---|
| JP | 2003-296027 | 10/2003 |
| JP | 2010-257012 | 11/2010 |

OTHER PUBLICATIONS

Extended European Search Report issued Aug. 30, 2012, in Patent Application No. 12159726.4.

\* cited by examiner

*Primary Examiner* — Alexander Eisen
*Assistant Examiner* — Nan-Ying Yang
(74) *Attorney, Agent, or Firm* — Oblon, McClelland, Maier & Neustadt, L.L.P.

(57) ABSTRACT

An information processing apparatus that includes a touch panel unit that detects a touch input; an application control unit that sets one of a plurality of application programs to an active state as an active-state application program; a profile information acquiring unit that acquires profile information corresponding to the active-state application program; and a parameter updating unit that sets a detection parameter of the touch panel unit based on the profile information.

19 Claims, 9 Drawing Sheets

FIG. 6

| APPLICATION | SENSITIVITY SETTING | NUMBER OF TIMES FOR INPUT-EVENT CONFIRMATION | INPUT-EVENT REPORTING RATE |
|---|---|---|---|
| STANDBY MENU | TOUCH-EVENT DETECTION SETTING IS ENABLED ON WHOLE SCREEN AND DETECTION SENSITIVITY IS SET TO HIGH BECAUSE DRAG OF ICON IS PERFORMED. | NUMBER OF TIMES OF CONFIRMATION IS DESIRABLY ONCE BECAUSE PERFORMANCE IS MORE EMPHASIZED. | SETTING OF MAXIMUM REPORTING RATE IS DESIRABLE BECAUSE SMOOTHNESS IN DRAG IS MORE EMPHASIZED. |
| GAME | HIGH SENSITIVITY IS SET ON WHOLE SCREEN FOR GAME REQUIRING SCREEN-WIDE TOUCH OPERATION, WHEREAS OPTIMIZED SETTING IS MADE FOR APPLICATION NOT REQUIRING SCREEN-WIDE TOUCH OPERATION. | NUMBER OF TIMES OF CONFIRMATION IS DESIRABLY ONCE BECAUSE PERFORMANCE IS MORE EMPHASIZED. | REPORTING RATE DEPENDS ON CONTENT BUT MAXIMUM PERFORMANCE IS GENERALLY SET. FOR GAMES WHOSE INPUT AREA CAN BE LIMITED, INPUT AREA CAN BE LIMITED TO REDUCE LOAD OF CPU. |
| KEYBOARD | SCREEN IS DIVIDED INTO SENSITIVITY-SETTING ENABLED PART AND DISABLED PART BECAUSE INPUT EVENTS OCCURRING IN AREA OTHER THAN INPUT KEY AREA (INCLUDING SPACES BETWEEN KEYS) ARE UNNECESSARY EVENTS. | INPUT EVENT IS DESIRABLY CONFIRMED PLURALITY OF TIMES, E.G., 3 TIMES, SO THAT PLURALITY OF UNINTENDED TOUCHES ARE NOT CONTINUOUSLY INPUT. | REPORTING RATE IS DESIRABLY SET LOW IN CONSIDERATION OF REDUCTION IN POWER CONSUMPTION BECAUSE KEY INPUT CAN BE SUFFICIENTLY EXECUTED AT REPORTING RATE OF APPROX. 30 Hz, FOR EXAMPLE. |

INFORMATION PROCESSING APPARATUS

CROSS REFERENCE TO RELATED APPLICATION

The present application claims the benefit of the earlier filing date of U.S. Provisional Patent Application Ser. No. 61/478,101 filed on Apr. 22, 2011, the entire contents of which is incorporated herein by reference.

BACKGROUND

Field of the Disclosure

The present disclosure relates to an information processing apparatus that includes a touch panel and can execute processing of various application programs after recognizing an instruction input from users by detecting a position touched with a finger of the users or the like.

Description of Related Art

FIG. 11 illustrates an example of a software configuration of a conventional information processing apparatus that includes a touch panel and can execute processing of various application programs after recognizing an instruction input from users by detecting a position touched with a finger of the users or the like.

In this FIG. 11, a launcher active manager 201 launches an application program. FIG. 11 gives an example in which one of a standby menu application program 202, a game application program 203, and a software keyboard application program 204 is launched as an example.

If there is an input event, such as touch by a user, a touch panel 210 outputs coordinate data for the input event to a touch driver 209. Meanwhile, for example, sensitivity for detecting the input event, a rate of reporting the input event, a number of times for confirming the event, and so forth are set to parameters that provide the highest design performance of the device in order that the touch panel 210 can handle all application programs used in the information processing apparatus.

The coordinate data output from the touch panel 210 is sent to a window manager 205 through the touch driver 209.

The window manager 205 is located at an upper layer, which is implemented in a language, such as Java (trademark), for example. For example, the input event is calculated from the coordinate data in a raw event calculator 206. Filtering processing of the input event corresponding to the application program is performed in a filter optimizer 208. Gesture determination processing of the input event is performed in a gesture detector 207. The window manager 205 then notifies the application program of information having undergone each processing.

Using the information received from the window manager 205, the application program determines the event input by the users and performs processing, such as extraction processing for extracting the information to be used in the application program. In this way, the application program can execute processing corresponding to the event input by the user.

SUMMARY

Meanwhile, in a case of the aforementioned example of the software configuration of the conventional information processing apparatus illustrated in FIG. 11, parameters providing the highest design performance of the device are set in order that the touch panel can handle all usable application programs as described before. Various kinds of calculations, determination processing, extraction processing, and so forth are performed for processing an input event at the upper layer, such as the window manager, before application processing corresponding to an event input by a user is executed. Accordingly, an amount of the calculation processing for the input event expands at the upper layer and the upper layer significantly consumes CPU resources and also consumes lots of electric power.

Additionally, conventional methods for improving the operability and the recognition rate of touch panels are directed to an improvement that completes in the device or an application directly providing user experience. A method that is optimized as an integrated system including a device and an application, for example, has not been proposed.

Furthermore, when various applications are executed in an information processing apparatus including a touch panel, specifications and performance required for the touch panel differ depending on which application is being executed. Accordingly, when uniform optimization methods intended for supporting existing devices and firmware are adopted, an increase in power consumption may be led or processing load of a CPU may increase, for example, depending on the application executed by the information processing apparatus.

Based on these, the inventor recognizes the desirability of optimizing the operability and the recognition rate of a touch panel not with a uniform optimization method intended for supporting existing devices and firmware but as an integrated system including a device and an application, for example.

According to a first exemplary embodiment the disclosure is directed to an information processing apparatus that includes a touch panel unit that detects a touch input; an application control unit that sets one of a plurality of application programs to an active state as an active-state application program; a profile information acquiring unit that acquires profile information corresponding to the active-state application program; and a parameter updating unit that sets a detection parameter of the touch panel unit based on the profile information.

According to another exemplary embodiment, the disclosure is directed to a method performed by an information processing apparatus. The method including setting one of a plurality of application programs of the information processing apparatus to an active state as an active-state application program; acquiring profile information corresponding to the active-state application program; and setting a detection parameter of a touch panel unit that detects a touch input based on the profile information.

According to another exemplary embodiment, the disclosure is directed to a non-transitory computer-readable medium including computer-program instructions, which when executed by an information processing apparatus, cause the information processing apparatus to perform a method. The method including setting one of a plurality of application programs of the information processing apparatus to an active state as an active-state application program; acquiring profile information corresponding to the active-state application program; and setting a detection parameter of a touch panel unit that detects a touch input based on the profile information.

In this way, in accordance with one embodiment of the present invention, it is possible to optimize operability and a recognition rate of a touch panel not with a uniform optimization method intended for supporting existing devices and firmware but as an integrated system including, for example, a device and an application.

BRIEF DESCRIPTION OF DRAWINGS

FIG. 6 is a diagram for use in a description of a setting example of sensitivity, a number of times of confirmation, and a reporting rate for each application program in the embodiment.

FIG. 11 is a diagram illustrating an example of a software configuration of a conventional information processing apparatus capable of executing processing of various application programs after recognizing an instruction input from users by detecting a position touched with a finger of the user or the like.

DETAILED DESCRIPTION

An embodiment to which that an information processing apparatus of the present disclosure is applied will be described below with reference to the drawings.

In this embodiment, a high-performance mobile information terminal including a touch panel on a display screen is used as an example of the information processing apparatus.

[Overview of Usability Optimization at time of Use of Touch Panel]

The mobile information terminal of this embodiment can execute various application programs and can optimize requirements and performance of the touch panel in accordance with a launched active-state application program.

Figure 1:
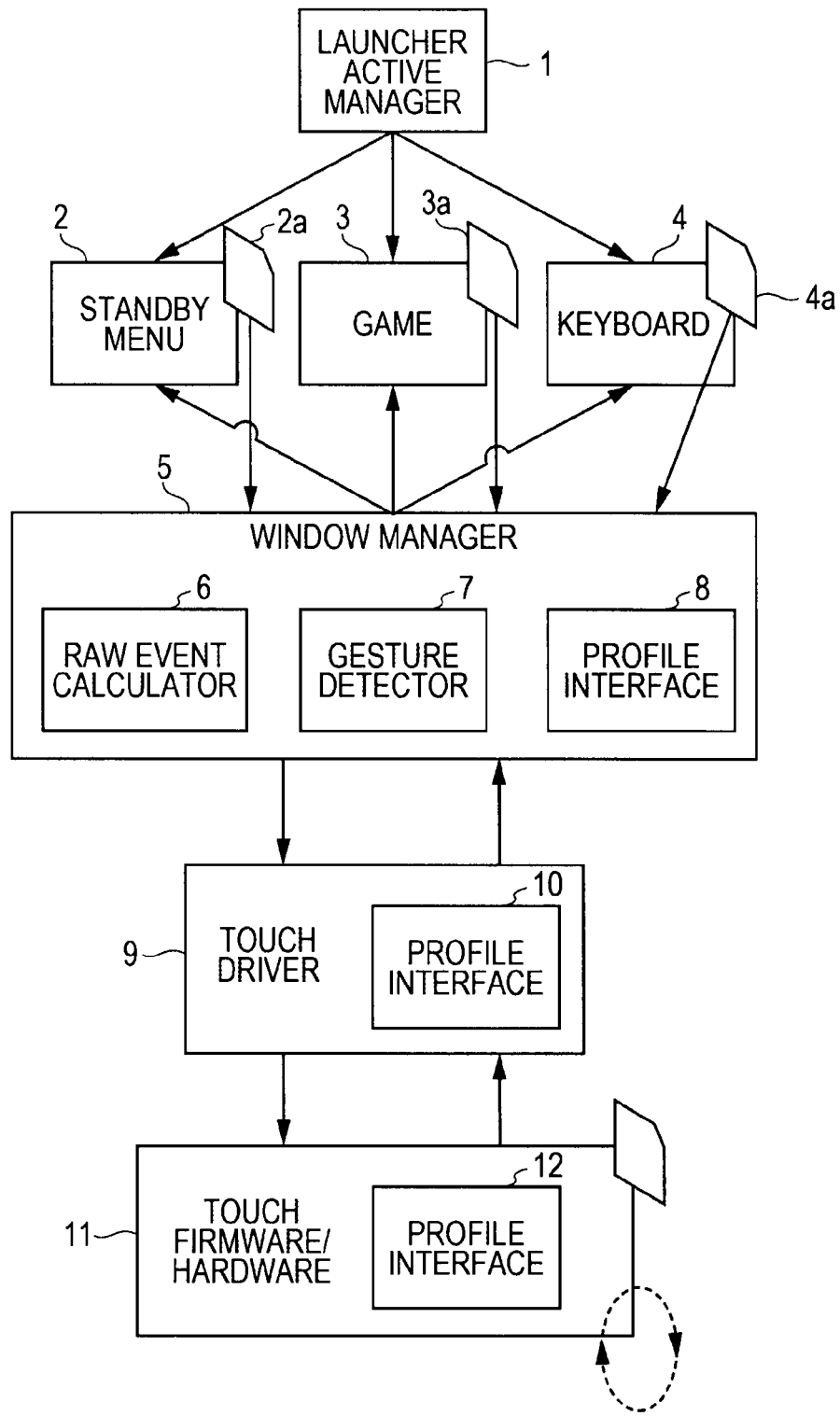
FIG. 1 is a diagram illustrating an overview of a software configuration that optimizes requirements and performance of a touch panel in accordance with an active-state application in an embodiment of the present invention.

FIG. 1 illustrates an overview of a software configuration for optimizing the requirements and the performance of the touch panel in accordance with the active-state application. As an example of application programs executing processing corresponding to operations on the touch panel (input events), FIG. 1 illustrates a standby menu application program 2, a game application program 3, and a software keyboard application program 4. Obviously, those application programs are merely examples and embodiments of the present disclosure are not limited to these application examples.

In this software configuration illustrated in FIG. 1, a launcher active manager 1 executes launching of an application program, switching, for example, one of a plurality of launched application programs into an active state, and so forth. An example of launching or switching one of the standby menu application program 2, the game application program 3, and the software keyboard application program 4 into the active state is illustrated in this FIG. 1.

Figure 2:
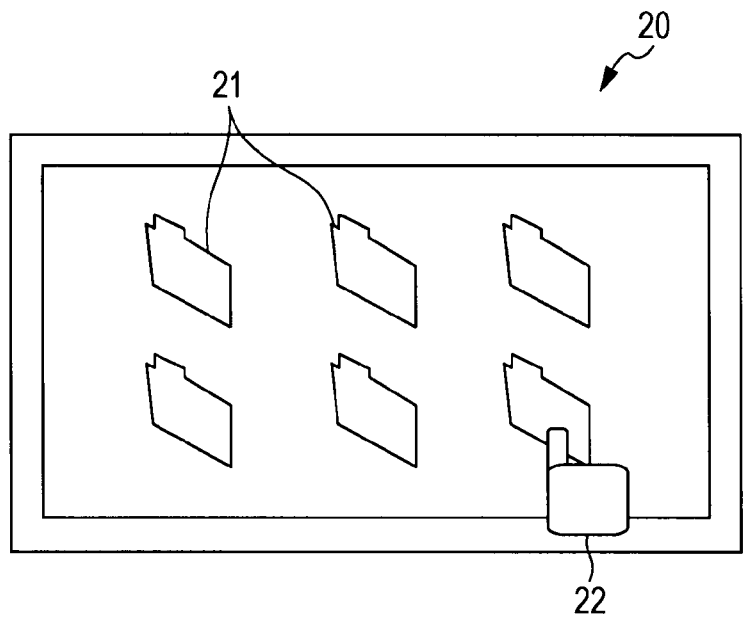
FIG. 2 is a diagram illustrating an example of a display screen when a standby menu application program is in the active state in the embodiment.

For example, as illustrated in FIG. 2, the standby menu application program 2 is a program to be in the active state when the mobile information terminal of this embodiment is in a standby state. As an example, a standby program of mobile phone terminals or the like can be given. When the standby menu application program 2 is in the active state, various menu icons 21, for example, are displayed on a display screen 20. Once a user touches the intended menu icon 21 with their finger 22 or the like on the display screen 20, the mobile information terminal executes processing of a menu corresponding to the icon 21 instructed through the touch event.

Here, when the standby menu application program 2 is in the active state, it is considered that a requirement increases for response speed for the user's first touching of the touch panel. Accordingly, when the standby menu application program 2 is in the active state, setting of the touch panel for the first touch event on the touch panel is desirably made so that the response speed of the touch panel increases, for example. On the other hand, in a case of a continuous input event, such as drag on the touch panel, for example, it is considered that the user hardly feels a change in the response speed physically even if the response speed is decreased more or less, for example. Accordingly, setting of the touch panel for the continuous input event, such as drag, is desirably made so that more emphasis is placed on a reduction in power consumption by lowering an input-event reporting rate, for example, than the increase in the response speed by raising the input-event reporting rate, for example.

Figure 3:
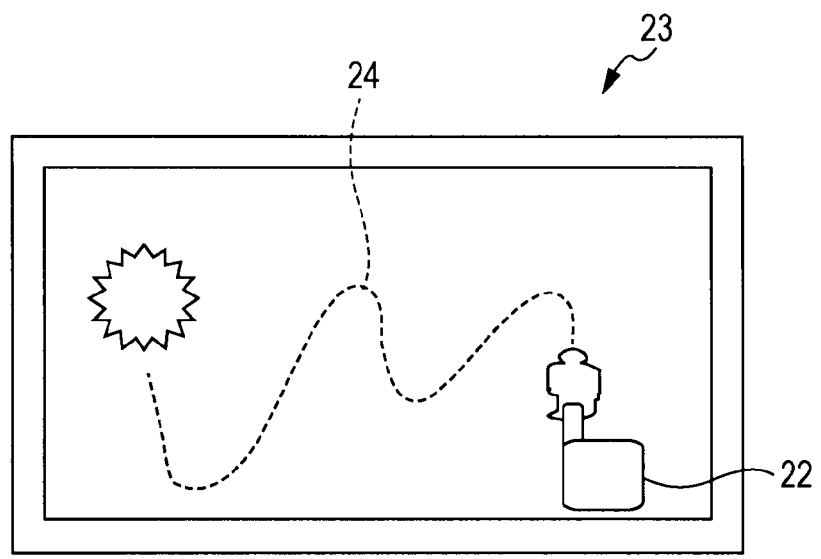
FIG. 3 is a diagram illustrating an example of a display screen when a game application program is in the active state in the embodiment.

Additionally, as illustrated in FIG. 3, for example, the game application program 3 is a program to be in the active state when a game is executed in the mobile information terminal of this embodiment. When the game application program 3 is in the active state, a game screen is displayed on a display screen 23. During execution of the game, various input events, such as touch and drag 24, are performed from the user. The mobile information terminal executes game processing corresponding to those input events.

Here, when the game application program 3 is in the active state, it is considered that high performance is required for sensitivity and processing speed of the whole touch panel, for example. It is also considered that the necessity for placing more emphasis on the reduction in power consumption is low. Furthermore, it is considered that the high performance is similarly required for the continuous input event, such as, for example, drag. Accordingly, when the game application program 3 is in the active state, setting of the touch panel is desirably made so that the sensitivity and the processing speed of the whole touch panel increase and the reporting rate of the continuous input event, such as drag, is also maintained at a high rate.

Figure 4:
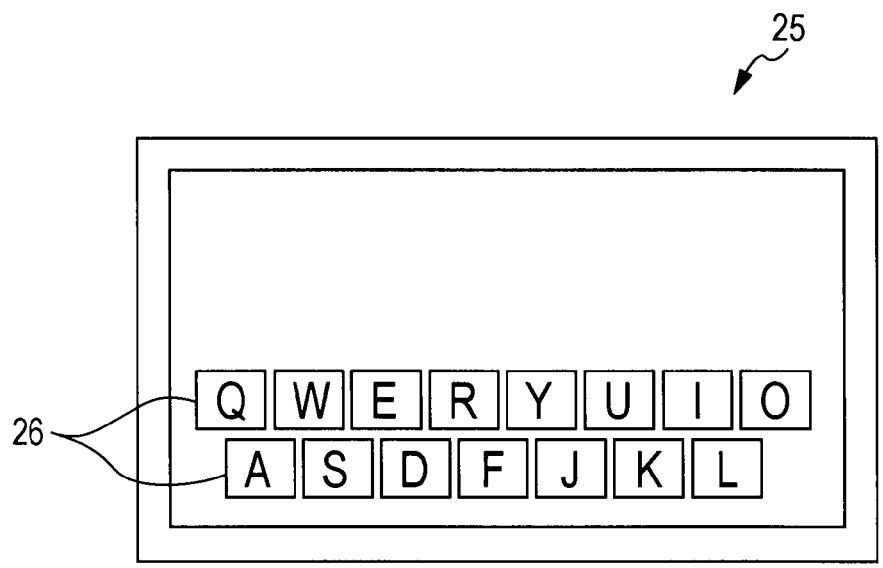
FIG. 4 is a diagram illustrating an example of a display screen when a software keyboard application program is in the active state in the embodiment.

In addition, as illustrated in FIG. 4, for example, the software keyboard application program 4 is a program to be in the active state when a software keyboard is displayed on a screen so as to make an input event on the software keyboard detectable. More specifically, when the software keyboard application program 4 is in the active state, a software keyboard in which each key icon 26 is arranged is displayed on a display screen 25. When a user touches the intended key icon 26 of the software keyboard on the display screen 25 with their finger 22 or the like, the mobile information terminal executes input processing of a character and so forth corresponding to the key icon 26, input of which is instructed through the touch event.

Figure 5:
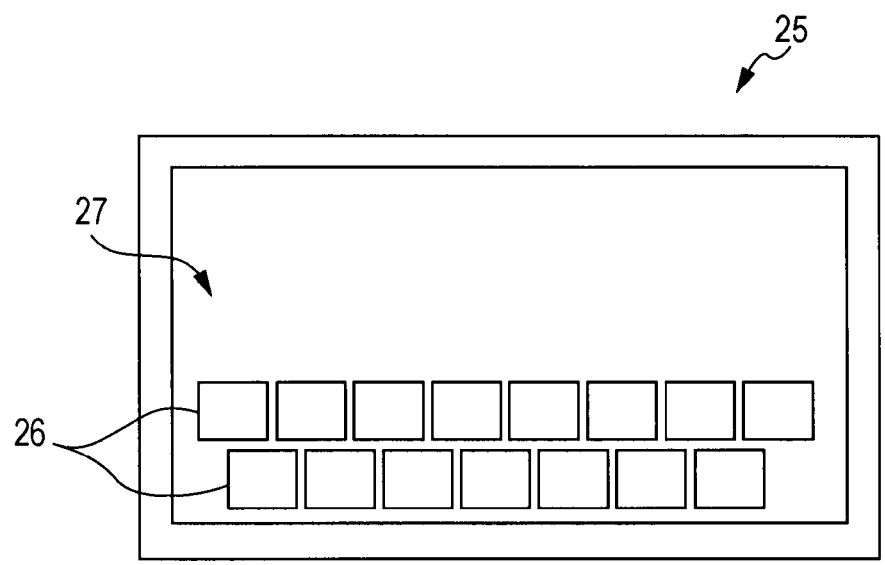
FIG. 5 is a diagram for use in a description of sensitivity at an area of a software keyboard and at the other area when the software keyboard application program is in the active state in the embodiment.

Here, when the software keyboard application program 4 is in the active state, it is considered that the touch panel is required to be able to correctly and highly accurately detect each key icon 26 of the software keyboard touched by the user without making any mistakes, for example. On the other hand, it is considered that actual key input speed by the user is much lower than the input-event reporting rate of the touch panel, for example. Accordingly, when the software keyboard application program 4 is in the active state, it is desirable to set the input-event reporting rate to a given slow level that is necessary and sufficient for the key input speed by the user. On the other hand, it is desirable to set a touch-event confirmation processing for determining that a touch event is performed on the key icon by the user when the touch event is detected from the same key icon a plurality of times at the input-event reporting rate, for example. In addition, for example, as illustrated in FIG. 5, it is desirable to raise detection sensitivity by increasing the input-event reporting rate for each key icon 26 of the software keyboard compared to that of another area 27 and to lower the sensitivity by decreasing the input-event reporting rate in the area 27 excluding each key icon 26 so that unnecessary wrong event detection is avoided.

Based on the description above, the specs and the performance required for the touch panel are desirably set as illustrated in FIG. 6, for example, when each of the aforementioned applications is in the active state.

More specifically, in FIG. 6, when the standby menu application program 2 is in the active state, touch-event detection setting is enabled on the whole display screen and the input-event detection sensitivity is set to high because the drag of a menu icon and so forth may be performed. Additionally, the number of times for confirming the input event is set to, for example, once because the performance is more emphasized. In addition, the input-event reporting rate is set to a maximum reporting rate because smoothness in a drag event, for example, is more emphasized.

Additionally, in FIG. 6, when the game application program 3 is in the active state, the input-event detection sensitivity is set to high sensitivity on the whole screen for a game for which the input event can be desirably detected on the whole display screen, whereas the sensitivity optimized for the area used by the game is set for a game for which the screen-wide input-event detection is unnecessary but only a specific area is used. The number of times of confirming the input event is set to, for example, once because the performance is more emphasized. The input-event reporting rate is set depending on game content, for example, but it is generally set to the highest reporting rate. However, when the game is used at a specific area, the reporting rate is set low in an area other than the specific area in order to reduce load of a CPU.

In addition, in FIG. 6, when the software keyboard application program 4 is in the active state, the input-event detection sensitivity is set to high sensitivity for part of the key icons, whereas the input-event detection sensitivity is lowered or disabled for an area other than the key icons. Regarding the number of times of confirming the input event, the number of times of event confirmation processing is set to a plurality of times (e.g., three times) for the key icon part. Since key input by the user can be sufficiently detected with, for example, a reporting rate of approximately 30 Hz, the input-event reporting rate is set to low in consideration of a reduction in power consumption.

In order to realize providing of seamless and optimum usability by optimizing the requirements and the performance of the touch panel in accordance with the active-state application program as described above, profile information for optimizing the whole system is introduced for each application program in this embodiment.

More specifically, the profile information of each application program is information for setting, for each application program, the input-event detection sensitivity, the number of times of input-event confirmation, and the input-event reporting rate in the touch panel as in, for example, FIG. 6 described above. In the example case of FIG. 1, profile information 2*a* for optimizing the touch panel for the program is prepared for the standby menu application program 2. Similarly, profile information 3*a* for optimizing the touch panel for the program is prepared for the game application program 3. Profile information 4*a* for optimizing the touch panel for the program is prepared for the software keyboard application program 4.

Figure 7:
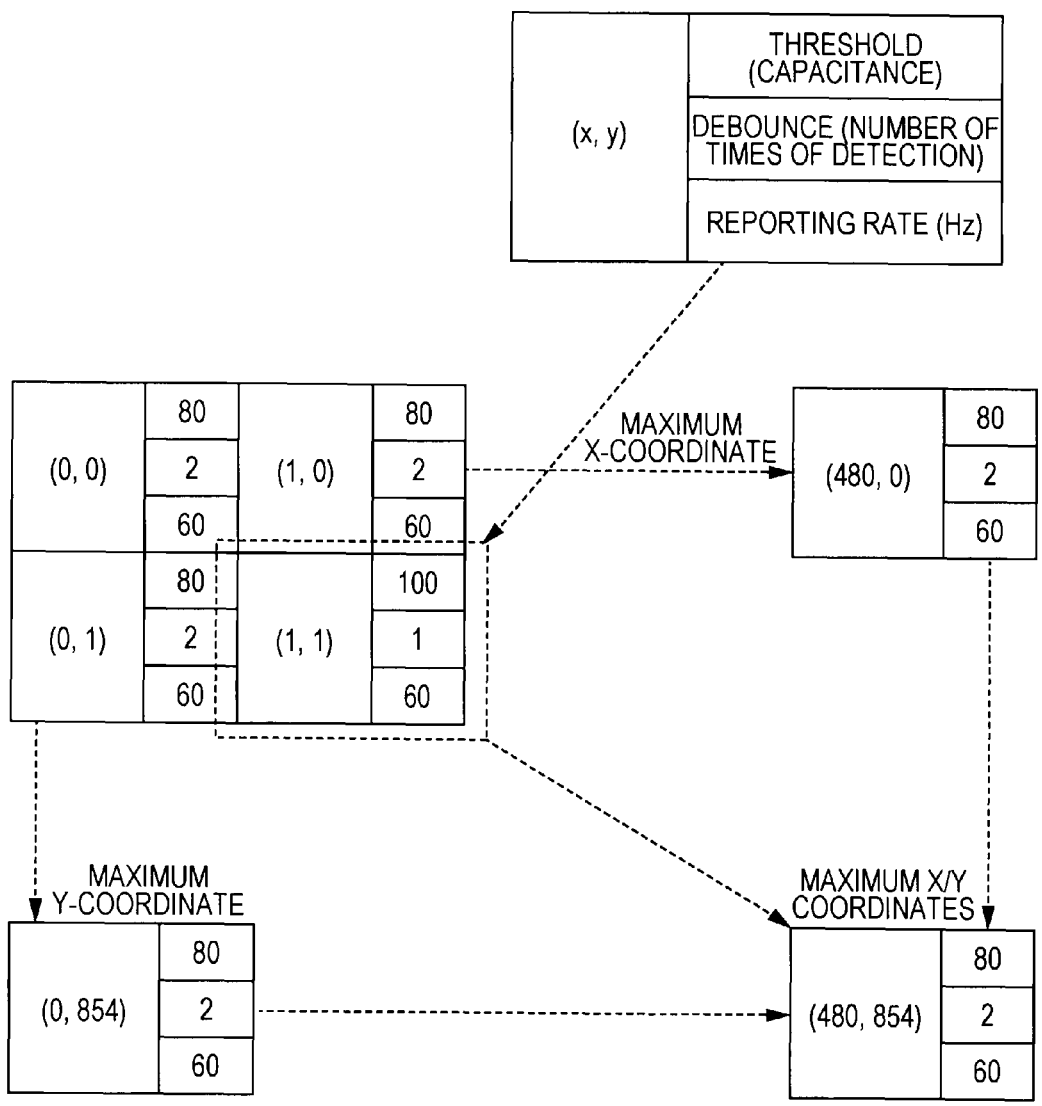
FIG. 7 is a diagram illustrating an example of a configuration of profile information prepared for each application program in the embodiment.

FIG. 7 illustrates an example of a schematic configuration of the profile information.

More specifically, this FIG. 7 illustrates an example of touch-panel profile information for a display screen of 480×854 pixels, for example. The profile information is constituted by parameters of X and Y coordinates corresponding to each pixel of the display, a threshold of the input-event detection sensitivity (threshold), a number of times of confirmation for use in confirming the input event (debounce), and the input-event reporting rate (reporting rate).

As in this example of FIG. 7, the profile information of this embodiment is information that can set the parameters of the threshold of the sensitivity, the number of times of confirmation, and the reporting rate in units of pixels, for example, as operation input detection conditions when the touch panel detects an operation input from the user.

Returning to the description of FIG. 1, the launcher active manger 1 sends the profile information of the active-state application to a window manager 5 upon launching or switching one of the above-described application programs into the active state.

The window manager 5 having received the profile information from the launcher active manager 1 sends the profile information to a touch driver 9 through a profile interface 8.

The touch driver 9 having received the profile information from the window manager 5 sends the profile information to a touch panel 11 through a profile interface 10.

The touch panel 11 having received the profile information from the touch driver 9 updates parameters of firmware using the profile information with a profile interface 12. In this way, setting of the touch panel 11 is optimized for the specifications and the performance required by the active-state application program. More specifically, the input-event detection sensitivity, the number of times of input-event confirmation, the input-event reporting rate, and so forth of the touch panel 11 are set to setting optimized for the active-state application program as described before in FIG. 6, for example.

Accordingly, when there is a user input event on the touch panel 11, coordinate data optimized for the active-state application program is output from the touch panel 11. That is, the touch panel 11 outputs the coordinate data that corresponds to the sensitivity, the reporting rate, and the number of times of confirmation, that is optimally handled by the application program, and based on which the active-state application program can accurately and rapidly determine the input event.

The coordinate data output from the touch panel 11 is sent to the active-state application program through the profile interface 10 of the touch driver 9 and further through the profile interface 8 of the window manager 5. That is, in a case of this embodiment, the active-state application program is supplied with the coordinate data corresponding to the optimum sensitivity, the reporting rate, and the number of times of confirmation as described before.

In this way, the active-state application program can execute processing corresponding to the input event of the coordinate data for which the sensitivity, the number of times of confirmation, and the reporting rate are optimized in the touch panel 11.

Figure 11:
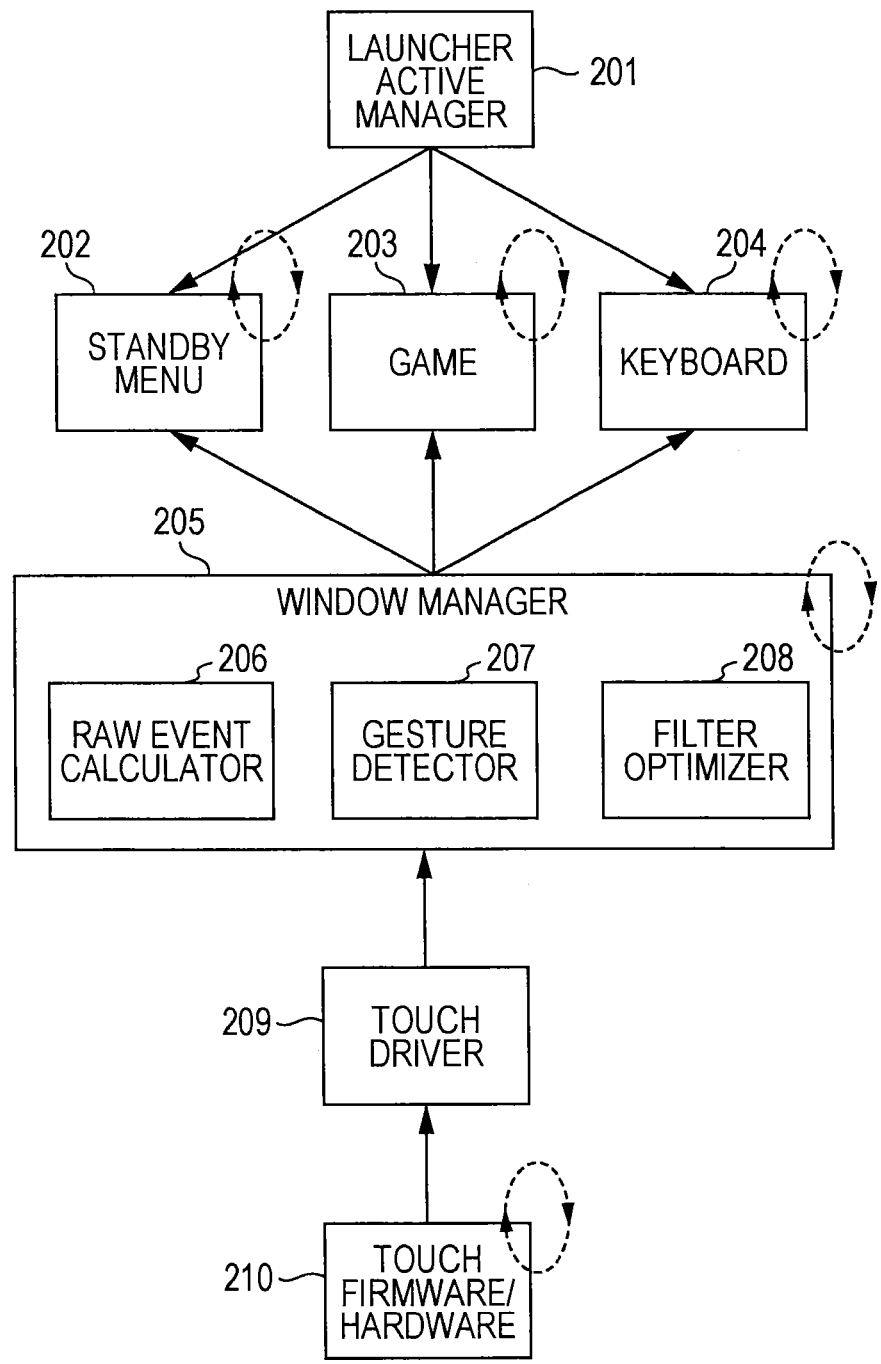

Meanwhile, a raw event calculator 6 and a gesture detector 7 of the window manager 5 may be unused in the mobile information terminal of this embodiment in a state where the parameters are optimized using the profile information as described before. More specifically, in the case of this embodiment, since the necessity of performing processing, such as one by the aforementioned window manager 205 of FIG. 11, is low in the window manager 5 and so forth, load of a CPU is reduced, whereby power consumption can be also reduced.

[Example of Processing Sequence in Software Configuration of Embodiment]

Figure 8:
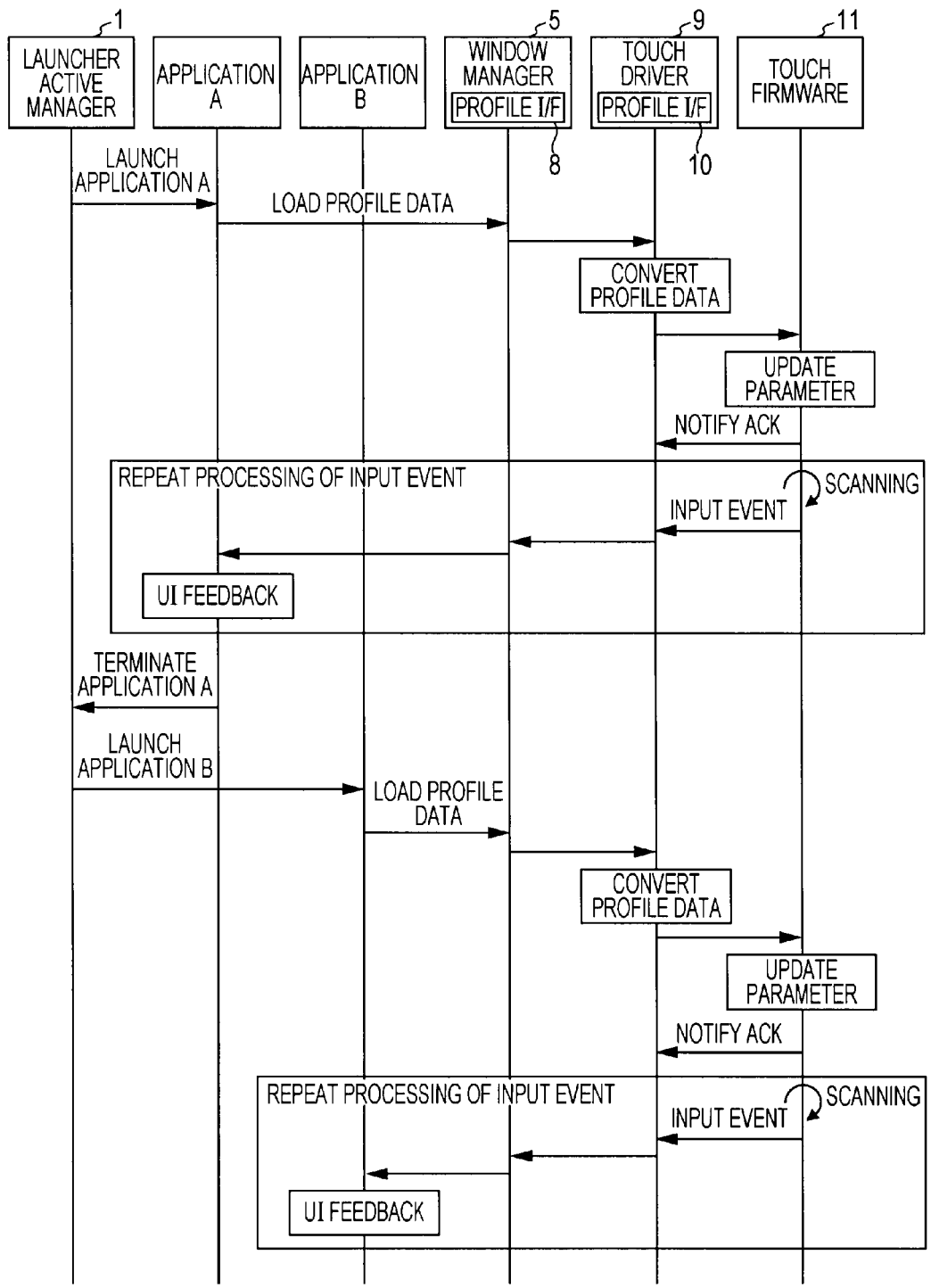
FIG. 8 is a diagram illustrating an example of a processing sequence in the software configuration of the embodiment.

FIG. 8 illustrates an example of a processing sequence in the software configuration illustrated in FIG. 1. This example of the processing sequence of FIG. 8 illustrates a flow of a case where an application program A is first launched, profile information of the application A is downloaded to the touch panel 11 in response to the activation, the active-state application program is then switched to an application program B, and firmware of the touch panel 11 is updated based on profile information of the application program B.

In this FIG. 8, once the launcher active manger 1 launches, for example, the application A, the profile information of the application program A is sent to the touch driver 9 through the profile interface 8 of the window manager 5.

The touch driver 9 converts the profile information into information compliant with the firmware of the touch panel 11 with the profile interface 10. The converted profile information is sent to the touch panel 11.

The touch panel 11 updates the parameters based on the converted profile information supplied from the touch driver 9. In this way, setting of the touch panel 11 is optimized for the application program A. After the update completes, the touch panel 11 returns, to the touch driver 9, a response signal indicating that preparation for reporting an input event has completed.

Thereafter, scanning for detecting an input event starts in the touch panel 11. Upon detecting the input event from the user, the touch panel 11 outputs coordinate data for the input event to the touch driver 9.

The coordinate data of the input event is sent to the application program A from the touch driver 9 through the window manager 5. In this way, the application program A recognizes the input event and executes processing corresponding to the input event.

The processing from scanning of the input event to execution of the corresponding processing by the application program A is repeated until the application program A terminates.

When the launcher active manager 1 then launches the application program B after terminating the application program A, for example, the profile information of the application program B is sent to the touch driver 9 through the profile interface 8 of the window manager 5.

In the touch driver 9, the profile interface 10 converts the profile information of the application program B into information compliant with the firmware of the touch panel 11. The converted profile information is sent to the touch panel 11.

The touch panel 11 updates the parameters based on the converted profile information supplied from the touch driver 9. In this way, the setting of the touch panel 11 is optimized for the application program B. After the update of the parameters completes, the touch panel 11 returns, to the touch driver 9, a response signal indicating preparation for reporting an input event has completed.

Thereafter, scanning for detecting an input event starts in the touch panel 11. Upon detecting the input event from the user, the touch panel 11 outputs coordinate data for the input event to the touch driver 9.

The coordinate data of the input event is sent to the application program B from the touch driver 9 through the window manager 5. In this way, the application program B recognizes the input event and executes processing corresponding to the input event.

The processing from scanning of the input event and to execution of the corresponding processing by the application program B is repeated until the application program B terminates.

[Configuration of Major Part of Mobile Information Terminal]

Figure 9:
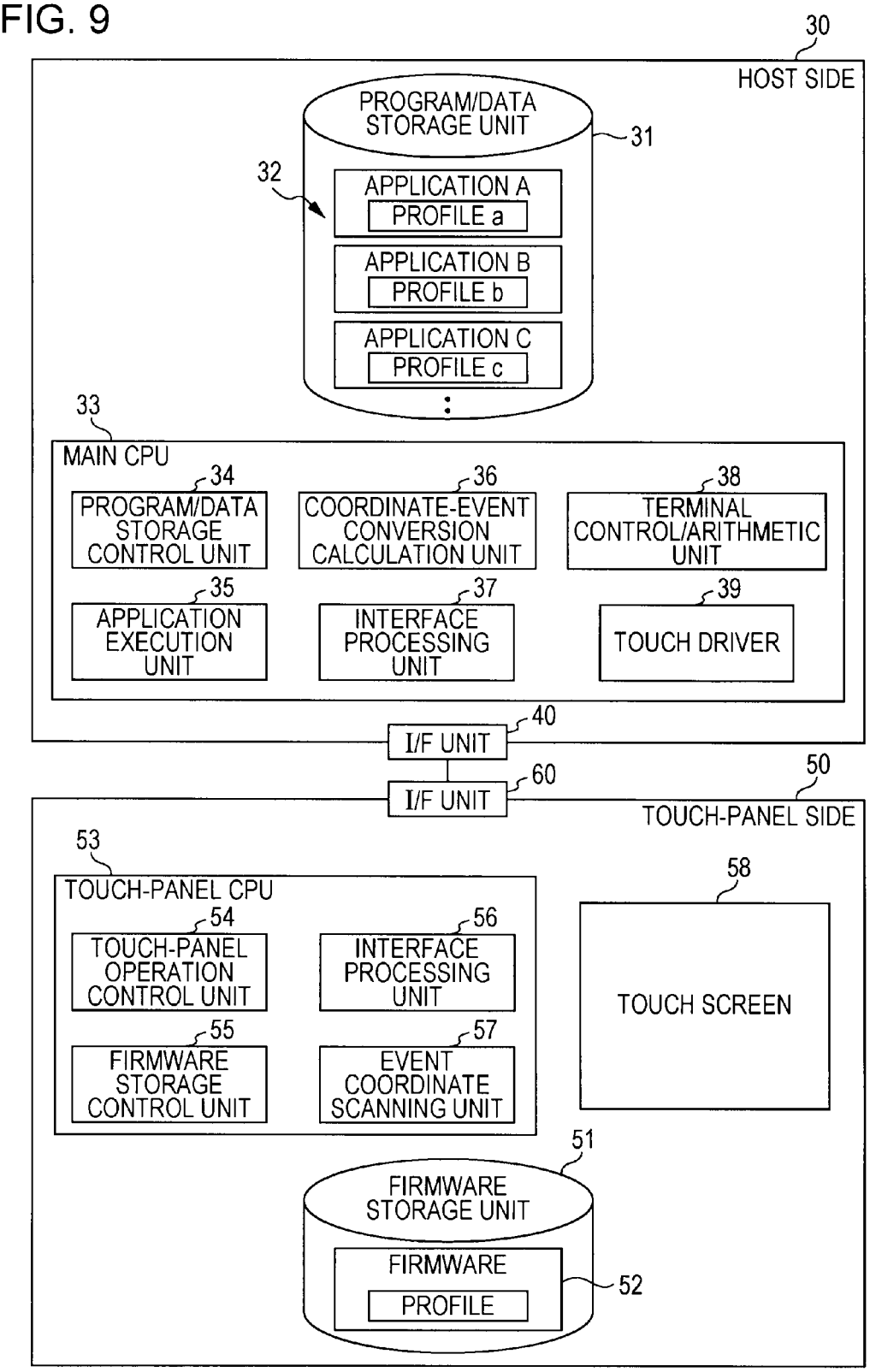
FIG. 9 is a diagram illustrating an example of a configuration realizing update of parameters of a touch panel using profile information of an active-state application program, detection of an input event by the touch panel, and execution of processing of the application program corresponding to the input event in a mobile information terminal of the embodiment.

FIG. 9 is a diagram illustrating an example of a configuration realizing update of the parameters of the touch panel using the above-described profile information of the active-state application program, detection of an input event by the touch panel whose parameters are updated, and execution of processing of the application program corresponding to the input event in the mobile information terminal of the embodiment.

In this FIG. 9, a host side 30 of the mobile information terminal includes, as major components relating to this embodiment, a program/data storage unit 31, a main CPU 33, and an interface unit 40 to be connected to a touch-panel side 50.

The program/data storage unit 31 of the host side 30 is, for example, an internal memory or the like of the mobile information terminal of this embodiment and stores various application programs 32, such as the aforementioned ones for the standby menu, the game, and the software keyboard, and data used by those programs. Suppose that, in this example case of FIG. 9, the program/data storage unit 31 stores an application program A and profile information "a" thereof, an application program B and profile information "b" thereof, and an application program C and profile information "c" thereof. These application programs 32 and the data are stored in the program/data storage unit 31 before factory shipment of the mobile information terminal of this embodiment or are acquired via various communication networks, such as, for example, the Internet, a semiconductor memory, a disk recording medium, and so forth and stored in the program/data storage unit 31.

The main CPU 33 of the host side 30 operates based on an OS (operating system) and has a function of each of a terminal control/arithmetic unit 38, a program/data storage control unit 34, an application execution unit 35, a coordinate-event conversion calculation unit 36, a touch driver 39, and an interface processing unit 37.

The program/data storage control unit 34 controls writing and reading of the application programs/data to and from the program/data storage unit 31, respectively. For example, when an instruction for launching an intended application program is input from a user, the program/data storage control unit 34 serves as the launcher active manager 1 to read out the intended application program.

The application program intended by the user is read out from the program/data storage unit 31 and the application program is loaded and formed in an internal memory, whereby the application execution unit 35 can execute the application program.

The touch driver 39 corresponds to the foregoing touch driver 9 of FIG. 1.

The interface processing unit 37 performs data transmission/reception processing with the touch-panel side 50 connected through the interface unit 40 supporting so-called SPI/I2C, for example. In a case of this embodiment, the interface processing unit 37 performs processing for outputting the above-described profile information to the touch-panel side 50 and processing for receiving the coordinate data sent from the touch-panel side 50. Meanwhile, the host side 30 can control setting values of firmware of the touch-panel side 50. In this embodiment, update of the profile information can be realized in a form of expanding a mechanism thereof.

A coordinate-event conversion calculation unit 36 determines an input event from the coordinate data sent from the touch-panel side 50. Information on the input event is sent to the application execution unit 35. In this way, the application execution unit 35 can execute processing corresponding to the input event.

The terminal control/arithmetic unit 38 executes control of the entirety of the mobile information terminal and various kinds of arithmetic processing. In a case of this embodiment, the control/arithmetic unit 38 has a function of the aforementioned window manager 5, for example.

The touch-panel side 50 includes, as major components, a touch screen 58, a touch-panel CPU 53, an interface unit 60 to be connected to the host side 30, and a firmware storage unit 51.

The touch screen 58 is a capacitive touch screen sensor, for example. The touch screen 58 scans and detects a touched position and so forth upon being touched with a finger of users or the like.

The touch-panel CPU 53 is a CPU for executing firmware. The touch-panel CPU 53 calculates a position of the touching finger, the number of touching fingers, and so forth based on a capacitance value detected by the touch screen 58. Meanwhile, information on the position of the touching finger and the number of the touching fingers is sent to the host side 30 through the SPI/I2C or the like.

An event coordinate scanning unit 57 of the touch-panel CPU 53 scans user input on the touch screen 58 and generates coordinate data of the input event when there is a user input event.

A touch-panel operation control unit 54 controls operations of each unit of the touch-panel side 50.

An interface processing unit 56 performs data transmission/reception processing with the host side 30 connected through the interface unit 60 supporting so-called SPI/I2C, for example. In a case of this embodiment, the interface processing unit 56 performs processing for receiving the aforementioned profile information sent from the host side 30, processing for sending the coordinate data to the host side 30, and so forth.

A firmware storage control unit 55 performs writing of firmware 52 in the firmware storage unit 51 prepared as an internal memory, update of the firmware 52, and so forth. In a case of this embodiment, when the profile information is sent from the host side 30, the firmware storage control unit 55 updates parameters of the firmware storage unit 51 based on the profile information. More specifically, when, for example, the application program A is set in the active state in the host side 30, the firmware storage control unit 55 rewrites the parameters of the firmware storage unit 51 with the profile information of the application program A.

[Schematic Configuration of Mobile Information Terminal]

Figure 10:
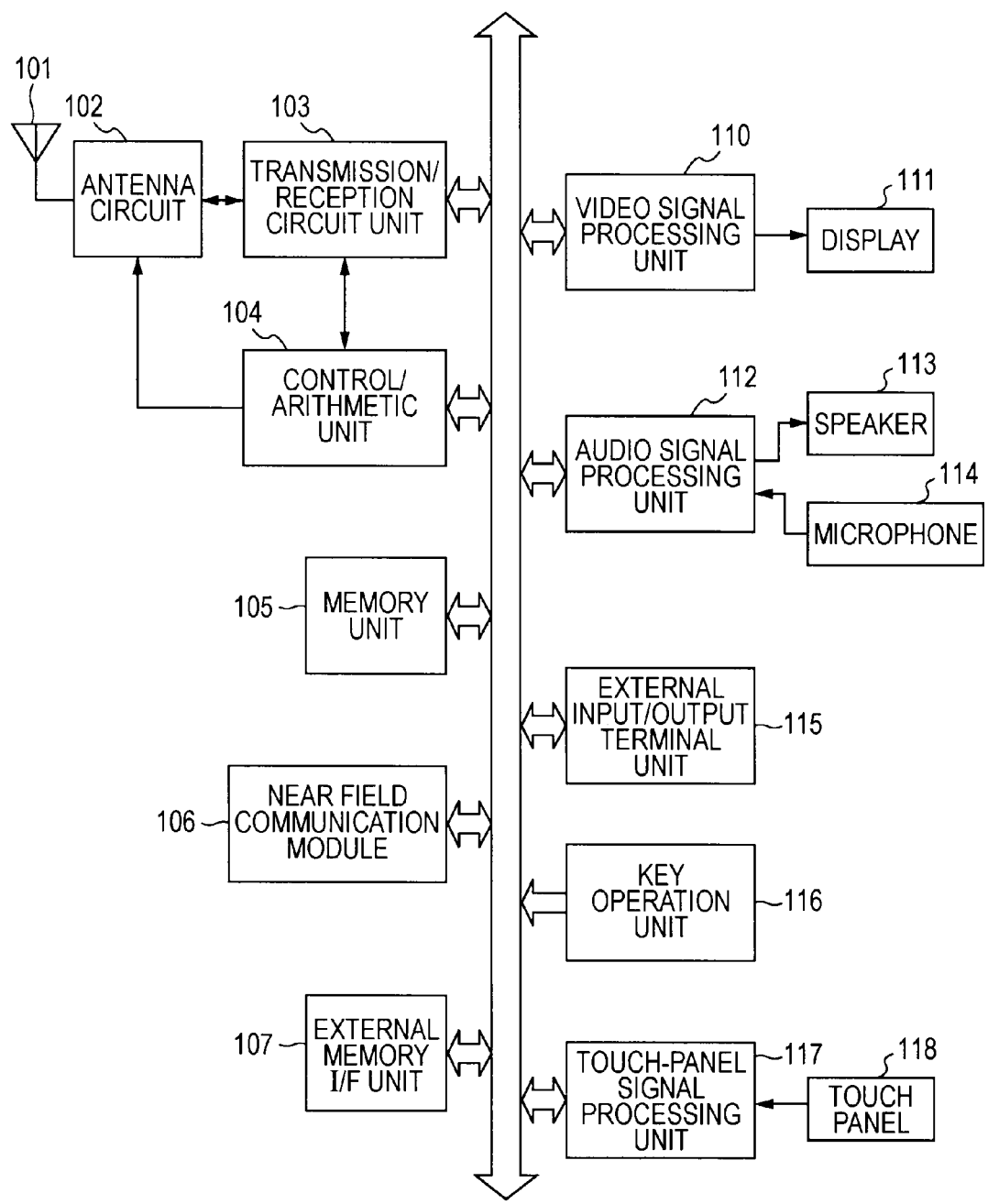
FIG. 10 is a block diagram illustrating an example of an overview of an overall internal configuration of the mobile information terminal of the embodiment.

FIG. 10 illustrates an example of a schematic overall internal configuration of the mobile information terminal of this embodiment. Meanwhile, the mobile information terminal of this embodiment is constituted by, for example, a high-performance mobile phone terminal, a tablet terminal, and so forth in which a touch panel including a transparent touch detecting surface arranged to cover substantially a whole surface of a display screen, for example.

In FIG. 10, a communication antenna 101 is, for example, an internal antenna, and performs transmission/reception of phone calls and emails via a mobile phone network and a public wireless communication network, download of various application programs including the application programs having the profile information of this embodiment, and transmission/reception of signal radio waves for connecting to the Internet. An antenna circuit 102 is constituted by an antenna switch, a matching circuit, a filter circuit, and so forth. A transmission/reception circuit unit 103 performs frequency conversion, modulation, and demodulation of signals transmitted and received via the mobile phone network and the public wireless communication network.

A speaker 113 is a speaker provided in the mobile information terminal of this embodiment and is used for, for example, reproduction of music, output of received audio, output of ringer sound (an ring alert), and so forth. A microphone 114 is used for collecting external audio and collecting audio to be transmitted. An audio signal processing unit 112 is constituted by an amplifier circuit for the speaker 113, an amplifier circuit for the microphone 114, an decompressing/decoding circuit for decompressing and decoding compressed and encoded audio data supplied from a control/arithmetic unit 104, a digital/analog conversion circuit for converting the decompressed/decoded digital audio data into an analog audio signal, an analog/digital conversion circuit for converting an analog audio signal input from the microphone 114 into digital audio data, a compressing/encoding circuit for compressing and encoding the digital audio signal, and so forth.

A video signal processing unit 110 is constituted by a decompressing/decoding circuit for decompressing and decoding compressed and encoded video data supplied from the control/arithmetic unit 104, a display panel driving circuit for displaying the decompressed and decoded digital video and digital broadcast video on a display panel 111, and so forth. Additionally, in a case of this embodiment, the video signal processing unit 110 generates video signals for displaying desktop images, various menu images (such as menu icons in a standby state), a game image, a software keyboard, and so forth supplied from the control/arithmetic unit 104 and displays those images on the display panel 111.

A key operation unit 116 is constituted by hardware keys disposed on a casing of the mobile information terminal of this embodiment and a peripheral circuit thereof. The key operation unit 116 converts an operation input on the hardware key by a user into an electric signal, performs amplification and analog/digital conversion on the operation input signal, and sends the analog/digital-converted operation input data to the control/arithmetic unit 104.

An external memory I/F unit 107 is constituted by an external-memory slot to which and from which an external memory of a semiconductor storage medium or the like is attached and removed, respectively, an interface circuit for external memory data communication, and so forth. The mobile information terminal of this embodiment can acquire the application programs having the profile information according to this embodiment, various kinds of data and application programs through a storage medium, such as an external memory inserted into the external memory I/F unit 107.

Meanwhile, in the mobile information terminal of this embodiment, the profile information may be not only information accompanying the application program but also information to be acquired alone. In such a case, the profile information may include application correspondence information indicating which application program corresponds to the profile information. The application correspondence information may be not only usable for one application program but also be usable commonly for a plurality of application programs. Additionally, the profile information may be acquired not only by reading out the profile information stored in the aforementioned memory or the like but also acquired via various communication networks, such as the Internet.

An external input/output terminal unit 115 is constituted by, for example, a connector for connecting a cable when data communication is performed through the cable, an interface circuit for external data communication, a charger terminal for charging an internal battery through a power cable or the like, a charge interface circuit therefor, and so forth. The mobile information terminal of this embodiment can acquire, from an external device connected to the external input/output terminal unit 115, the application programs having the profile information according to this embodiment, various kinds of data, and various application programs.

Meanwhile, the application programs having the profile information according to this embodiment may be recorded on, for example, a disk recording medium or other recording media. In this case, the application program read out from the recording medium by a recording-medium playback apparatus included in a personal computer or the like, for example, may be supplied to the external input/output terminal unit 115. Obviously, the external input/output terminal unit 115 may be directly connected to the recording-medium playback apparatus and an application program read out by the playback apparatus may be supplied to the mobile information terminal of this embodiment.

A near field communication module 106 is constituted by a communication antenna for near field radio waves, such as a wireless LAN and Bluetooth®, and a near field communication circuit. The application programs having the profile information according to this embodiment may be acquired through the near filed communication module 106.

A touch panel 118 corresponds to the above-described touch panel 11 of this embodiment. The touch panel 118 is an input operation unit having a detection surface on which an operation input by a user can be detected. The touch panel 118 is constituted by a transparent touch screen sensor arranged substantially on the whole surface of the display panel 111. A touch-panel signal processing unit 117 corresponds to the above-described touch driver 9 of this embodiment. Meanwhile, the touch panel 118 and the touch-panel signal processing unit 117 in this embodiment support so-called multi-touch and are not only capable of detecting the number of contact points of a plurality of touch events but also can detect, for each contact point, touch duration time, a touch interval, a moving direction, moving speed, a moving path, and so forth.

A memory unit 105 is constituted by an internal memory disposed inside this terminal and a removable card memory. As the removable card memory, a card storing so-called SIM (Subscriber Identity Module) information or the like can be given. The internal memory is constituted by a ROM and a RAM. The ROM stores an OS (operating system), control programs allowing the control/arithmetic unit 104 to control each unit, various initial setting values, dictionary data, various kinds of sound data, application programs having the profile information according to this embodiment, and so forth. This ROM includes a rewritable ROM, such as a NAND-type flash memory or an EEPROM (electrically erasable programmable read-only memory), and can store various kinds of data and various user setting values. The RAM serves as a work area and a buffer area when the control/arithmetic unit 104 performs various kinds of data processing to store data as needed.

The control/arithmetic unit 104 is constituted by a main CPU (Central Processing Unit). The control/arithmetic unit 104 controls each unit, such as the transmission/reception circuit unit 103, the video signal processing unit 110, the audio signal processing unit 112, the near field communication module 106, the external memory I/F unit 107, the external input/output terminal unit 115, the key operation unit 116, and the touch-panel signal processing unit 117, and performs various kinds of arithmetic processing as needed. The control/arithmetic unit 104 also executes a control program stored in the memory unit 105 and the application programs having the profile information according to this embodiment.

In addition, the mobile information terminal of this embodiment obviously includes each component provided in general mobile information terminals, such as a time-measuring unit that measures a period and time, a battery that supplies electric power to each unit, a power management IC that control the electric power of the battery, a digital broadcasting reception module for receiving digital television broadcasting and digital radio broadcasting, a non-contact communication module that performs non-contact communication used by, for example, so-called RFID (Radio Frequency Identification) and an non-contact IC card, a GPS module that determines latitude and longitude of a current position of this terminal using a GPS signal from a GPS (Global Positioning System) satellite, a camera unit constituted by an imaging device for capturing still images and moving images, an optical system and a peripheral circuit thereof, and a light driving circuit for emitting image-shooting auxiliary light, various sensor units, such as, for example, a gyro sensor, an acceleration sensor, a direction sensor, a temperature sensor, a humidity sensor, and an illumination sensor.

CONCLUSION

As described above, an information processing apparatus according to one embodiment of the present disclosure includes a touch panel unit that includes a panel surface on which an operation input by a user can be detected and in which a condition at time of the operation input on the panel surface is settable as a parameter, an active application control unit that sets one of a plurality of application programs in an active state, a profile information acquiring unit that acquires profile information for optimizing the parameter of the touch panel unit for the active-state application program, and a parameter updating unit that updates the parameter of the touch panel unit using the profile information corresponding to the active-state application program.

Here, the profile information is included in the application program. The profile information acquiring unit acquires the profile information from the active-state application program.

Additionally, the profile information is prepared for each of the plurality of application programs. The profile information acquiring unit acquires the profile information corresponding to the active-state application program among the plurality of application programs.

In addition, the parameter is a setting parameter of firmware of the touch panel unit. The parameter updating unit updates the setting parameter of the firmware of the touch panel unit using the profile information.

Additionally, the profile information is information that sets, as the parameter, sensitivity for detecting the operation input on the panel surface of the touch panel unit, a number of times for confirming detection of the operation input, and a reporting rate at time of outputting detection information.

Furthermore, the profile information is information that sets, as the parameter, a set of coordinate values corresponding to each pixel of a display panel on which the panel surface of the touch panel unit is arranged, a threshold of the sensitivity for detecting the operation input for each of the sets of coordinate values corresponding to the pixels, the number of times for confirming detection of the operation input for each of the sets of coordinate values corresponding to the pixels, and the reporting rate at time of outputting the detection information for each of the sets of coordinate values corresponding to the pixels.

Next, an information processing method according to one embodiment of the present disclosure includes setting, by an active application control unit, one of a plurality of application programs in an active state, acquiring, by a profile information acquiring unit, profile information for optimizing, for the active-state application program, a parameter of a touch panel unit in which a condition at time of an operation input on a panel surface is settable as the parameter, and updating, by a parameter updating unit, the parameter of the touch panel unit using the profile information corresponding to the active-state application program.

In addition, an information processing program according to one embodiment of the present disclosure causes a computer of an information processing apparatus to operate as an active application control unit that sets one of a plurality of application programs in an active state, a profile information acquiring unit that acquires profile information for optimizing, for the active-state application program, a parameter of a touch panel unit in which a condition at time of an operation input on a panel surface is settable as the parameter, and a parameter updating unit that updates the parameter of the touch panel unit using the profile information corresponding to the active-state application program.

Additionally, a recording medium according to one embodiment of the present invention stores an information processing program causing a computer of an information processing apparatus to operate as an active application control unit that sets one of a plurality of application programs in an active state, a profile information acquiring unit that acquires profile information for optimizing, for the active-state application program, a parameter of a touch panel unit in which a condition at time of an operation input on a panel surface is settable as the parameter, and a parameter updating unit that updates the parameter of the touch panel unit using the profile information corresponding to the active-state application program.

Accordingly, it is possible to optimize operability and a recognition rate of a touch panel not with a uniform optimization method intended for supporting existing devices and firmware but as an integrated system including, for example, a device and an application in the embodiments of the present invention. More specifically, in accordance with the embodiments of the present invention, the profile information is introduced into each application program. The profile information that optimizes the parameter for the active-state application program is dynamically downloaded. The parameter of the touch panel is updated using the profile information. In this way, providing seamless and optimum usability can be realized.

Meanwhile, the mobile information terminal of the embodiment can be not only applied to mobile terminals, such as, for example, a so-called PDA (Personal Digital Assistant), a notebook personal computer, a portable game machine, a portable navigation terminal in addition to, for example, a high-function mobile phone terminal, a tablet terminal, or a slate PC, but also applied to various fixed electronic devices insofar as the devices include a display panel capable of displaying images and a touch panel.

Additionally, the description of the foregoing embodiment is merely an example of the present invention. Accordingly, the present invention is not limited to the foregoing embodiment. Obviously, the foregoing embodiment can be variously altered depending on the design or the like within a scope not departing from the technical idea of the present invention.

Furthermore, it should be obviously understood by those skilled in the art that various modifications, combinations, and other embodiments may occur depending on design or other factors insofar as they are within the scope of the claims of the present invention or the equivalents of the claims.

The invention claimed is:

1. An information processing apparatus, comprising:
a touch panel device that detects a touch input; and
circuitry configured to
set one of a plurality of application programs to an active state as an active-state application program;
acquire profile information corresponding to the active-state application program; and
set a detection parameter of the touch panel device based on the acquired profile information, wherein
the circuitry is configured to set a software keyboard application as the active-state application program;
the profile information corresponding to the software keyboard application includes information for setting, as the detection parameter, a first sensitivity threshold for detecting a touch input at the touch panel device at positions corresponding to each of a plurality of key icons of the software keyboard application and a second sensitivity threshold for detecting a touch input at the touch panel device at positions other than the positions corresponding to each of the plurality of key icons, the second sensitivity threshold being lower than the first sensitivity threshold;

the positions, which have the second sensitivity threshold, are distinct and separate from the plurality of key icons of the software keyboard application;

the profile information corresponding to the software keyboard application includes information for setting, as the detection parameter, a reporting rate defining a speed at which a detected touch input is output by the touch panel device, the reporting rate corresponding to the software keyboard application being lower than a reporting rate corresponding to each of other application programs; and the plurality of application programs include a standby menu application program, a game application program and a keyboard application program.

2. The information processing apparatus of claim 1, wherein the profile information is information for optimizing the detection parameter of the touch panel device for the active-state application program.

3. The information processing apparatus of claim 1, wherein the active-state application program includes the profile information, and the circuitry is configured to acquire the profile information from the active-state application program.

4. The information processing apparatus of claim 1, wherein each of the plurality of application programs includes profile information, and the circuitry is configured to acquire the profile information from the active-state application program of the plurality of application programs.

5. The information processing apparatus of claim 1, wherein the profile information includes the detection parameter that is updated by the circuitry.

6. The information processing apparatus of claim 1, wherein the detection parameter is a firmware setting of the touch panel device.

7. The information processing apparatus of claim 1, wherein the circuitry is configured to convert the profile information into instructions compliant with a firmware of the touch panel device.

8. The information processing apparatus of claim 7, wherein the circuitry is configured to set the detection parameter of the touch panel device by replacing existing instructions of the firmware of the touch panel device with the converted profile information.

9. The information processing apparatus of claim 1, wherein the profile information includes information for setting, as the detection parameter, a sensitivity threshold for detecting the touch input.

10. The information processing apparatus of claim 1, wherein the profile information includes information for setting, as the detection parameter, a number of times for confirming detection of the touch input.

11. The information processing apparatus of claim 1, wherein the profile information includes information identifying sets of coordinate values, which each correspond to different pixel areas of a display panel on which a surface of the touch panel device is arranged.

12. The information processing apparatus of claim 11, wherein the profile information includes information for setting, as the detection parameter, a sensitivity threshold for detecting the touch input for each of the different pixel areas.

13. The information processing apparatus of claim 12, wherein the profile information includes information for setting, as the detection parameter, a number of times for confirming detection of the touch input for each of the different pixel areas.

14. The information processing apparatus of claim 13, wherein the profile information includes information for setting, as the detection parameter, a reporting rate defining a speed at which a detected touch input is output by the touch panel device for each of the different pixel areas.

15. The information processing apparatus of claim 4, wherein the profile information of each of the plurality of application programs includes information for setting, as the detection parameter, a sensitivity threshold for detecting the touch input at the touch panel device, the sensitivity threshold setting being different for each of the plurality of application programs.

16. A method performed by an information processing apparatus, the method comprising:

setting one of a plurality of application programs of the information processing apparatus to an active state as an active-state application program;

acquiring profile information corresponding to the active-state application program; and setting a detection parameter of a touch panel device that detects a touch input based on the acquired profile information, wherein a software keyboard application is set as the active-state application program;

the profile information corresponding to the software keyboard application includes information for setting, as the detection parameter, a first sensitivity threshold for detecting a touch input at the touch panel device at positions corresponding to each of a plurality of key icons of the software keyboard application and a second sensitivity threshold for detecting a touch input at the touch panel device at positions other than the positions corresponding to each of the plurality of key icons, the second sensitivity threshold being lower than the first sensitivity threshold;

the positions, which have the second sensitivity threshold, are distinct and separate from the plurality of key icons of the software keyboard application;

the profile information corresponding to the software keyboard application includes information for setting, as the detection parameter, a reporting rate defining a speed at which a detected touch input is output by the touch panel device, the reporting rate corresponding to the software keyboard application being lower than a reporting rate corresponding to each of other application programs; and the plurality of application programs include a standby menu application program, a game application program and a keyboard application program.

17. A non-transitory computer-readable medium including computer-program instructions, which when executed by an information processing apparatus, cause the information processing apparatus to perform a method comprising:

setting one of a plurality of application programs of the information processing apparatus to an active state as an active-state application program;

acquiring profile information corresponding to the active-state application program; and setting a detection parameter of a touch panel device that detects a touch input based on the acquired profile information, wherein a software keyboard application is set as the active-state application program;

the profile information corresponding to the software keyboard application includes information for setting, as the detection parameter, a first sensitivity threshold for detecting a touch input at the touch panel device at positions corresponding to each of a plurality of key icons of the software keyboard application and a second sensitivity threshold for detecting a touch input at the touch panel device at positions other than the positions corresponding to each of the plurality of key icons, the second sensitivity threshold being lower than the first sensitivity threshold;

the positions, which have the second sensitivity threshold, are distinct and separate from the plurality of key icons of the software keyboard application;

the profile information corresponding to the software keyboard application includes information for setting, as the detection parameter, a reporting rate defining a speed at which a detected touch input is output by the touch panel device, the reporting rate corresponding to the software keyboard application being lower than a reporting rate corresponding to each of other application programs; and the plurality of application programs include a standby menu application program, a game application program and a keyboard application program.

18. The information processing apparatus of claim 1, wherein the second sensitivity threshold corresponds to disabling detection of a touch input by the touch panel at the positions other than the positions corresponding to each of the plurality of key icons.

19. The information processing apparatus of claim 18, wherein the positions other than the positions corresponding to each of the plurality of key icons includes positions between each of the plurality of key icons.

* * * * *